Nov. 12, 1929.  B. PRATT  1,735,790
ANGLE COCK
Filed Jan. 30, 1928

Inventor
BEST PRATT

By Ch. Parker
Attorney

Patented Nov. 12, 1929

1,735,790

UNITED STATES PATENT OFFICE

BEST PRATT, OF CHICAGO, ILLINOIS

ANGLE COCK

Application filed January 30, 1928. Serial No. 250,564.

This invention relates to angle cocks, and more particularly to such a device adapted for use in connection with the air brake pipe lines of railroad trains.

An important object of the invention is to provide means by which the angle cock or valve body may be simply, quickly and rigidly supported in operative position.

Another object of the invention is to provide a valve body having means formed integrally therewith which may be connected directly to novel supporting means for the valve body.

A further object of the invention is to provide an angle cock which is adapted to be so arranged with relation to the support as to protect the valve mechanism contained in the valve body.

Other objects and advantages of the invention will become apparent during the course of the following description.

Figure 1:
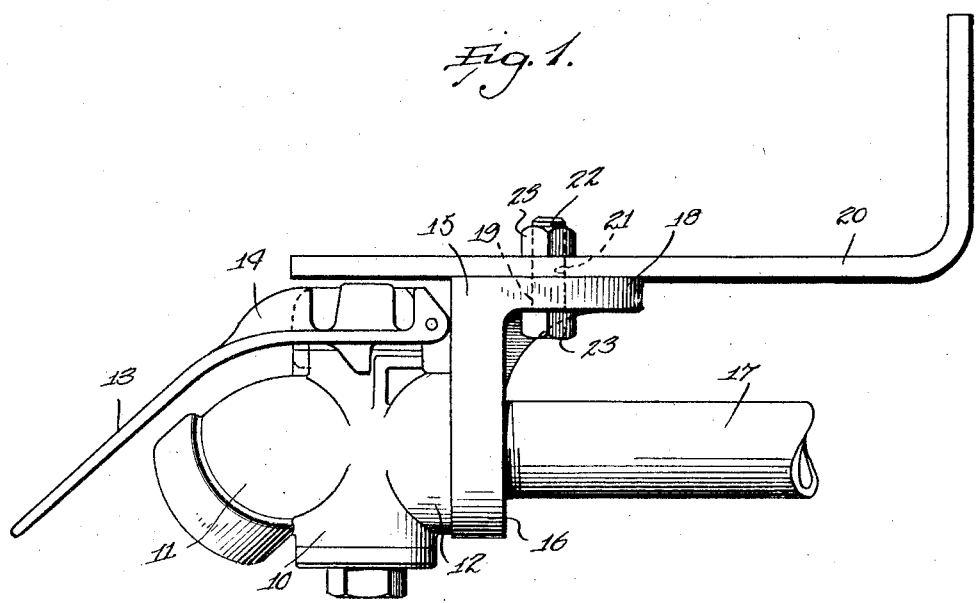
Figure 2:
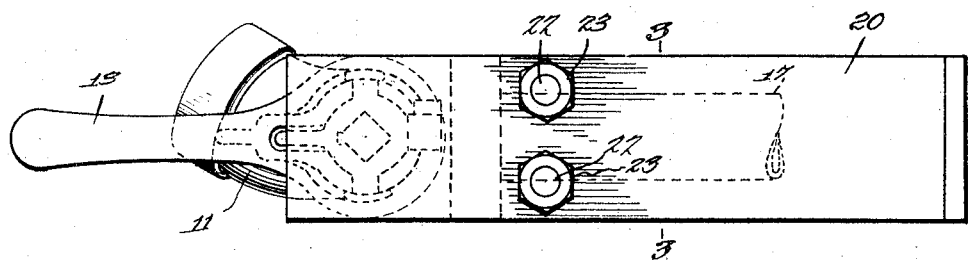
Figure 3:
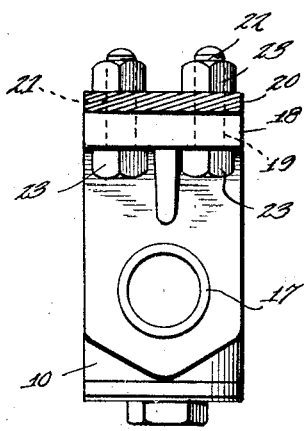

In the drawings, I have shown a preferred embodiment of my invention. In this showing, Figure 1 is a side elevation of the angle cock and associated elements, Figure 2 is a plan view of the same, and, Figure 3 is a section on line 3—3 of Figure 2.

Referring to the drawings, numeral 10 designates a valve body provided with the usual conduits 11 and 12 adapted for connection with the train pipes used to convey compressed air to the braking system. The valve mechanism (not shown) may be actuated by means of handle 13 through the valve operating mechanism 14. One of the conduits 12 has a bracket 15 formed integrally therewith, one of the legs 16 of the bracket being provided with an opening for the reception of a train pipe 17. The other leg 18 of the bracket, which is preferably but not necessarily formed at substantially a right angle to the leg 16 of the bracket, is provided with openings 19. Reference numeral 20 designates a support which advantageously may be connected to the end sill of a railroad car to which the angle cock is to be attached. This support is likewise provided with openings 21 corresponding to the openings formed in the horizontal leg of the bracket 15. Bolts 22 provided with nuts 23 are adapted to rigidly secure the bracket 15, and likewise the angle cock itself, which is formed integrally with the bracket, to the support 20. The end of the support extends over and protects the valve mechanism contained in the valve body 10 from injury.

In the ordinary method of attaching angle cocks to a railroad car the angle cock is usually formed with a hexagonal portion on one of the conduits into which the train pipes are screwed. This hexagonal portion, commonly known as the "hex", serves as a means for screwing the angle cock on the train pipe and also serves as a means to cooperate with various forms of angle cock holders in order to hold the angle cock in such a position that the hose connections employed between two adjacent cars will not become fouled or worn when the cars are making a turn. Since such angle cock supports are located at points spaced from the car body there is considerable strain placed upon the angle cock holder and they are often broken when in use, thus leading to air brake failures and possibly serious consequences. It will be apparent that by employing a device such as hereinabove described the angle cock may be rigidly connected to the support and need not be spaced from the car body and, because of its location, be easily broken. It is customary for trainmen to stand upon the angle cocks of cars when performing work between the cars, etc., and this abusive use of angle cocks is a source of considerable damage thereto. The provision of the projecting end of the support 20 affords protection to the valve and prevents workmen from standing upon the stem of the valve.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A device of the character described comprising a valve body containing valve mechanism, an angular bracket carried thereby adjacent one end of said valve body, a support for the device, and means for connecting said angular bracket to said support, said support having a portion extending over and protecting said valve mechanism.

2. A device of the character described comprising a valve body containing valve mechanism, an angular bracket carried thereby adjacent one end of said valve body and including a substantially vertical and a substantially horizontal leg, and a support arranged over said valve body, said horizontal leg being adapted for connection with said support, said support having a portion extending beyond said angular bracket and over said valve body and adapted to protect said valve mechanism.

3. A device of the character described comprising a valve body containing valve mechanism, a support provided with a substantially flat lower face arranged slightly above said valve body and having a portion extending over and adapted to protect said valve mechanism, an angular bracket carried by said valve body adjacent one end thereof, said angular bracket including a substantially vertical and a substantially horizontal leg, said horizontal leg being provided with a substantially flat upper face adapted to coact with the lower face of said support, said support and the horizontal leg of said bracket being provided with corresponding openings, and means extending through said openings adapted to rigidly connect said valve body to said support.

In testimony whereof I affix my signature.

BEST PRATT.